United States Patent
Day et al.

(10) Patent No.: US 7,543,882 B2
(45) Date of Patent: Jun. 9, 2009

(54) DUAL CELL REAR CORNER PILLAR FOR AUTOMOBILES

(75) Inventors: Frank Day, South Lyon, MI (US); James Lowe, Temperance, MI (US); John Reed, Hudson, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 427 days.

(21) Appl. No.: 11/429,096

(22) Filed: May 5, 2006

(65) Prior Publication Data

US 2007/0257517 A1 Nov. 8, 2007

(51) Int. Cl.
B62D 25/04 (2006.01)
(52) U.S. Cl. .................................. 296/193.06
(58) Field of Classification Search ............ 296/187.01, 296/190.01, 190.08, 193.01, 193.06, 202, 296/203.01, 205, 203.03
See application file for complete search history.

(56) References Cited

U.S. PATENT DOCUMENTS

| | | | |
|---|---|---|---|
| 4,826,238 A * | 5/1989 | Misono et al. .............. 296/209 |
| 4,986,597 A * | 1/1991 | Clausen ..................... 296/205 |
| 5,123,696 A | 6/1992 | Watari ........................ 296/195 |
| 6,053,561 A | 4/2000 | Hojnowski ............. 296/146.11 |
| 6,679,547 B2 * | 1/2004 | Ju-Sik .................... 296/203.03 |
| 6,705,668 B1 * | 3/2004 | Makita et al. .......... 296/187.03 |
| 6,827,390 B2 | 12/2004 | Zummallen ............ 296/146.11 |
| 7,293,823 B2 * | 11/2007 | Chen et al. ............. 296/203.03 |
| 2003/0006629 A1 * | 1/2003 | Kimura et al. ......... 296/203.03 |
| 2007/0024088 A1 * | 2/2007 | Mori et al. ............. 296/190.08 |

* cited by examiner

*Primary Examiner*—H Gutman
(74) *Attorney, Agent, or Firm*—Frederick Owens, Esq.; Miller Law Group, PLLC

(57) ABSTRACT

A dual cell rear corner pillar for the operator's compartment of a pick-up truck is formed with longitudinally oriented front and rear tubular members. The dual cell tubular construction increases section strength for the rear corner pillar while maintaining packaging constraints for the rear pillar design. The front tubular member is nested against the rear tubular member to provide support therefor longitudinally and vertically. The forward tubular member is welded to the door opening panel seal flange, while the rearward tubular member is welded to the window flange and the back panel flange. The forward and rearward tubular members are also welded to one another to form a strong pillar structure. The dual cell configuration resists buckling and shares loading. The rear tubular member wraps around the front tubular member and transitions into the roof rail area, shortening the unsupported moment arm of the rear tubular member.

19 Claims, 7 Drawing Sheets

DUAL CELL REAR CORNER PILLAR FOR AUTOMOBILES

FIELD OF THE INVENTION

This invention relates to the frame of an automotive vehicle and, more particularly, to a rear pillar configuration particularly adapted for use in pick-up trucks.

BACKGROUND OF THE INVENTION

The frame of an automotive vehicle supports an operator's compartment and includes a roof supported by generally vertical members commonly referred to as pillars. For vehicles referred to as pick-up trucks, the roof is normally supported by front and rear pillars, also known as the "A" and "B" pillars. The frame of the vehicle is required to withstand certain forces relating to crashes of the vehicle. Those crash standards help determine the configuration of the vehicle frame. Pick-up trucks are often designed with an enlarged operator's compartment that includes a rear passenger seat and a set of rear doors that can be hinged on the rear pillars to provide an open span between the front and rear pillars when the front and rear doors are opened.

This open span increases the longitudinal length of the roof and, as a result, increases the unsupported span over which load must be transferred to meet roof strength requirements and consequentially increases the moment applied to the base of the rear pillar of the operator's cab in a pick-up truck. The rear pillar is a critical contributor to the overall roof crush performance that allows up to five inches of deflection in which the load requirement must be met. The rear pillar becomes critical at the end of a crush test event as the rear pillar must contribute to the overall load absorbed by the operator's cab as the "A" pillar is first contacted and can only resist a given amount of the load. The rear pillar can be used to supplement the load resistance by the stiffness of the rear pillar.

Reinforcing the rear pillar in a pick-up truck is a design problem because the rear pillar conventionally has a large cross-sectional configuration and the packaging restraints include the rear door hinges, the rear door window, the back window and the seat belt restraints. Adding a large flat reinforcement to the rear pillar section is not likely to provide adequate benefits, as the reinforcement will tend to buckle under the imposed load instead of efficiently transferring the load.

In U.S. Pat. No. 5,123,696, issued to Tadayoshi Watari on Jun. 23, 1992, the rear pillar is provided with a reinforcement that forms a closed cross-section with the rear pillar inner panel. A pick-up truck having a rear door hinged to the rear pillar of the operator's cab is disclosed in U.S. Pat. No. 6,053,561, granted to Walter Hojnowski, et al on Apr. 25, 2000, wherein reinforcement plates are provided to reinforce the rear pillar. Similarly, the rear pillar is reinforced to improve crash performance in U.S. Pat. No. 6,705,668, issued to Masashi Makita on Mar. 16, 2004. In U.S. Pat. No. 6,827,390, granted to Robert Zummallen, et al on Dec. 7, 2004, the rear pillar is formed with inner and outer reinforcements that are welded to one another to form a box-like cross-section.

Accordingly, it would be desirable to provide a rear pillar design for a pick-up truck that would enhance roof strength while maintaining packaging constraints without utilizing large flat reinforcement members as is well known in the art.

SUMMARY OF THE INVENTION

It is an object of this invention to overcome the aforementioned disadvantages of the known prior art by providing a two-cell rear corner pillar construction for a pick-up truck.

It is an advantage of this invention that the two-cell rear pillar design provides greater section strength than a conventional one-cell pillar.

It is a feature of this invention that the two cells in the rear pillar can be nested.

It is another advantage of this invention that the nesting of two cells in the rear pillar of a pick-up truck allows the forward tube to provide support for the rearward tube.

It is another feature of this invention that the two tubes comprising the rear corner pillar can provide an inner attachment surface for mating trim parts for the operator's cab.

It is still another advantage of this invention that the dual cell rear corner pillar provides greater cost efficiencies, as each tube is less than six inches in diameter, which are readily available commercially.

It is yet another advantage of this invention that the dual cell rear pillar configuration utilizes smaller tubular members that are more easily formed into the specific shape required for the design of the vehicle.

It is still another feature of this invention that the dual cell rear pillar configuration allows trim attachments to be mounted easily.

It is yet another feature of this invention that the rear tube can wrap around the front tube as the rear tube transitions into the roof rail area.

It is still another advantage of this invention that the tubular design of the rear corner pillar allows the integration of multiple functions with very few additional structural pieces.

It is another object of this invention to provide a dual cell tubular rear corner pillar for a pick-up truck that is durable in construction, inexpensive of manufacture, carefree of maintenance, facile in assemblage, and simple and effective in use.

These and other objects, features and advantages are accomplished according to the instant invention by providing a dual cell rear corner pillar for the operator's compartment of a pick-up truck which is formed with longitudinally oriented front and rear tubular members. The dual cell tubular construction increases section strength for the rear corner pillar while maintaining packaging constraints for the rear pillar design. The front tubular member is nested against the rear tubular member to provide support therefor longitudinally and vertically. The forward tubular member is welded to the door opening panel seal flange, while the rearward tubular member is welded to the window flange and the back panel flange. The forward and rearward tubular members are also welded to one another to form a strong pillar structure. The dual cell configuration resists buckling and shares loading. The rear tubular member wraps around the front tubular member and transitions into the roof rail area, shortening the unsupported moment arm of the rear tubular member.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
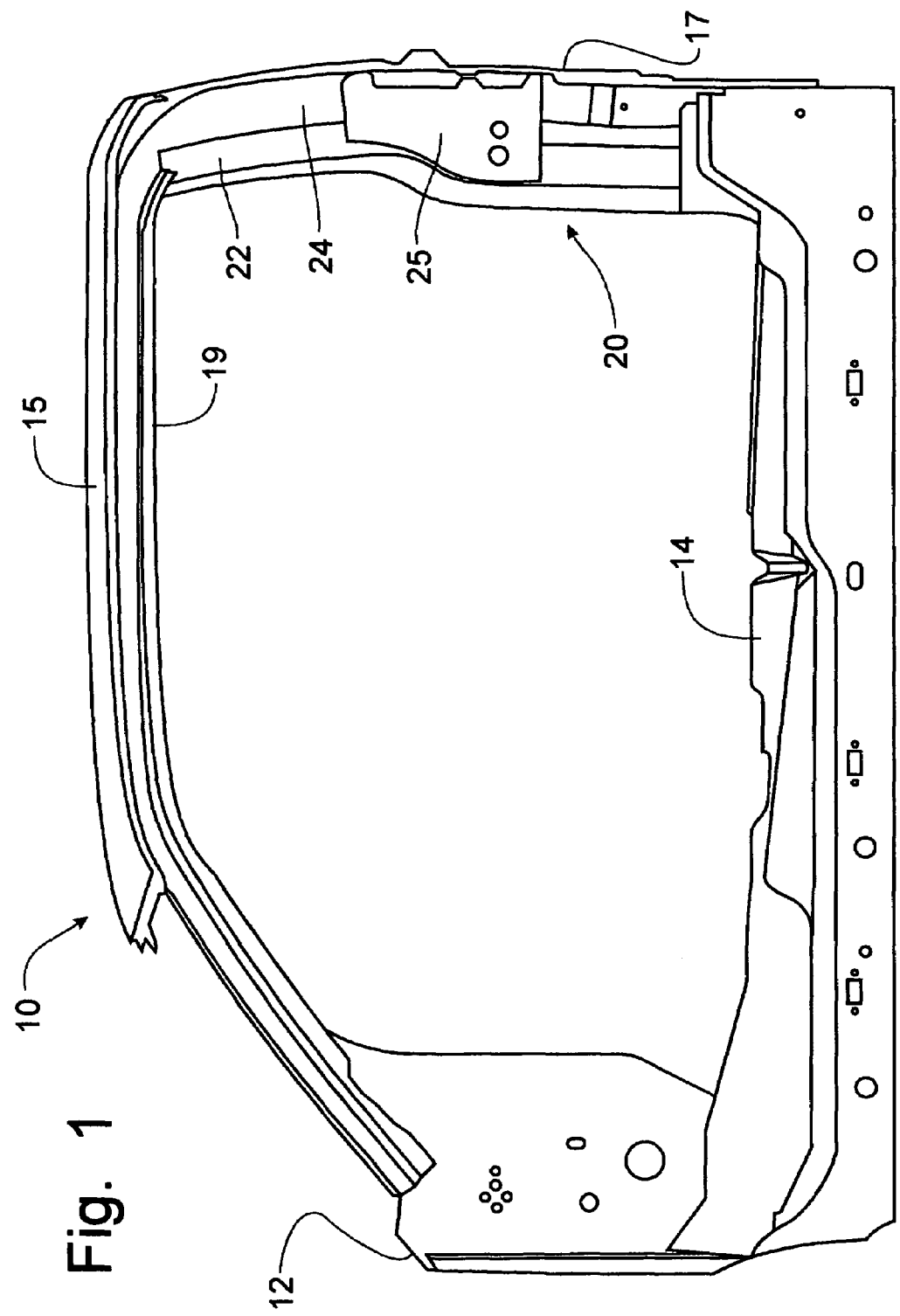
FIG. 1 is a side elevational view of a frame for an operator's cab of a pick-up truck incorporating the principles of the instant invention.
Figure 2:
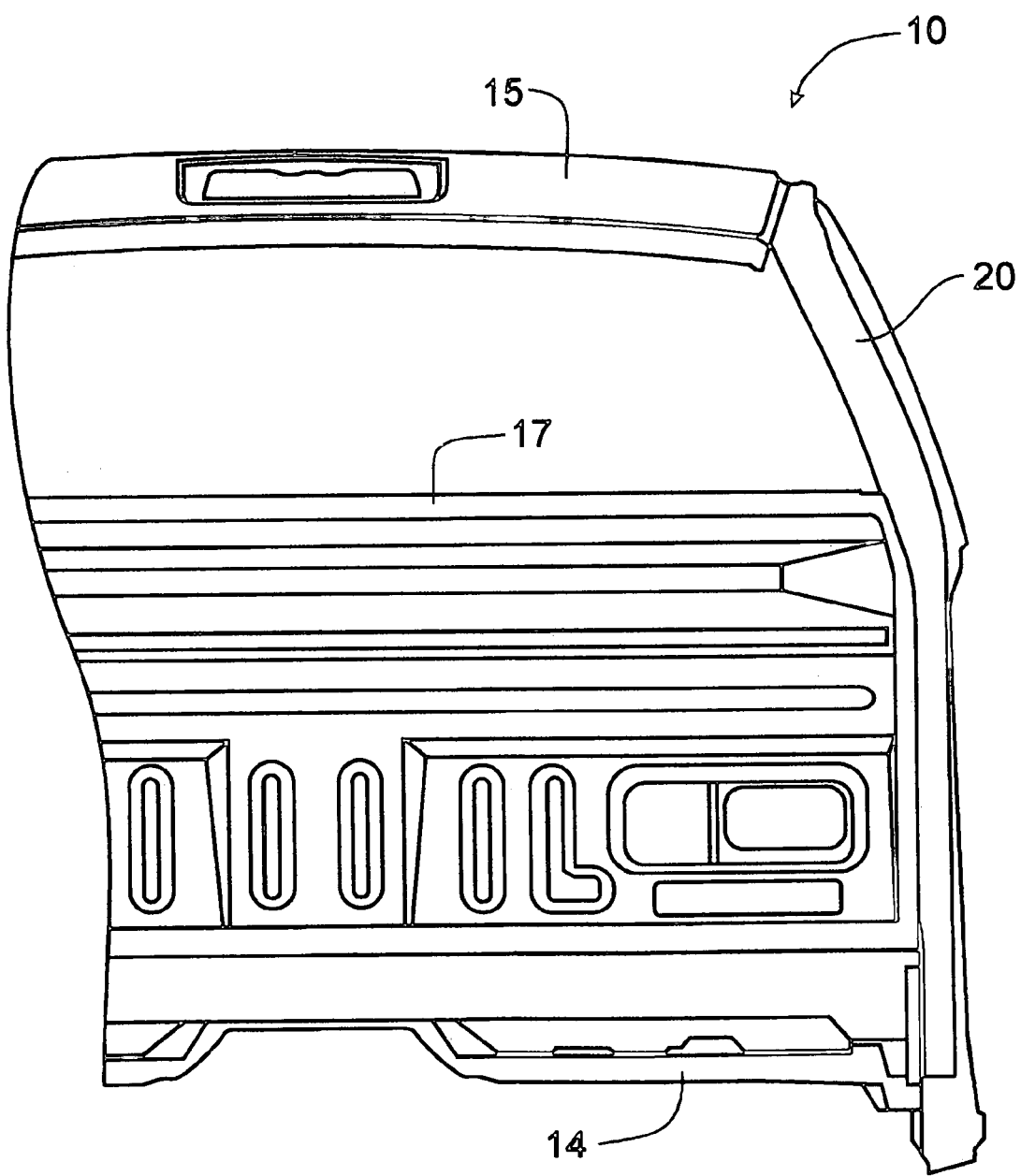
FIG. 2 is a partial rear elevational view of the operator's cab frame shown in FIG. 1.
Figure 3:
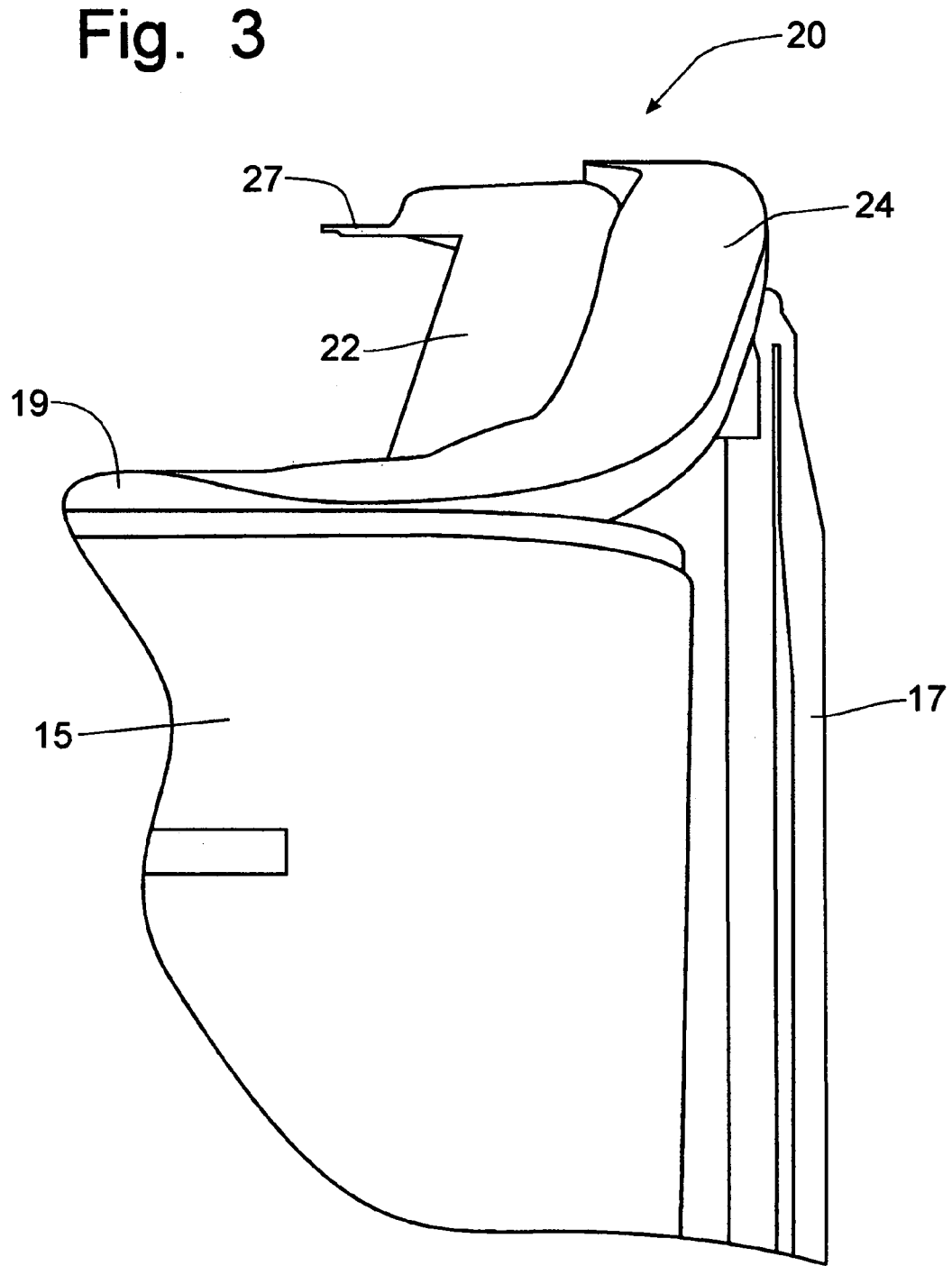
FIG. 3 is a partial top plan view of the operator's cab frame depicted in FIG. 1 showing the dual cell rear corner pillar.
Figure 4:
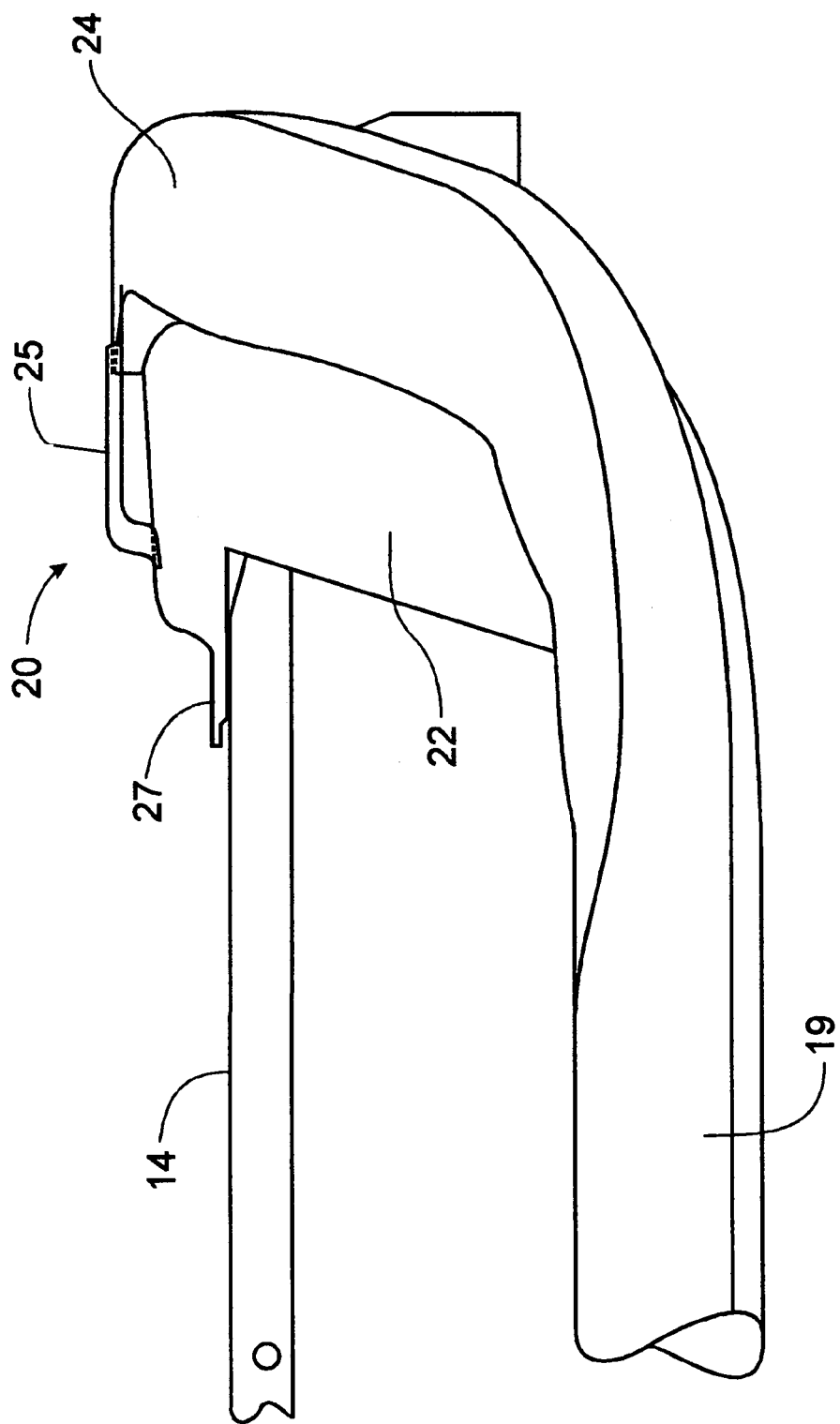
FIG. 4 is an enlarged partial top plan view of the dual cell rear corner pillar.
Figure 5:
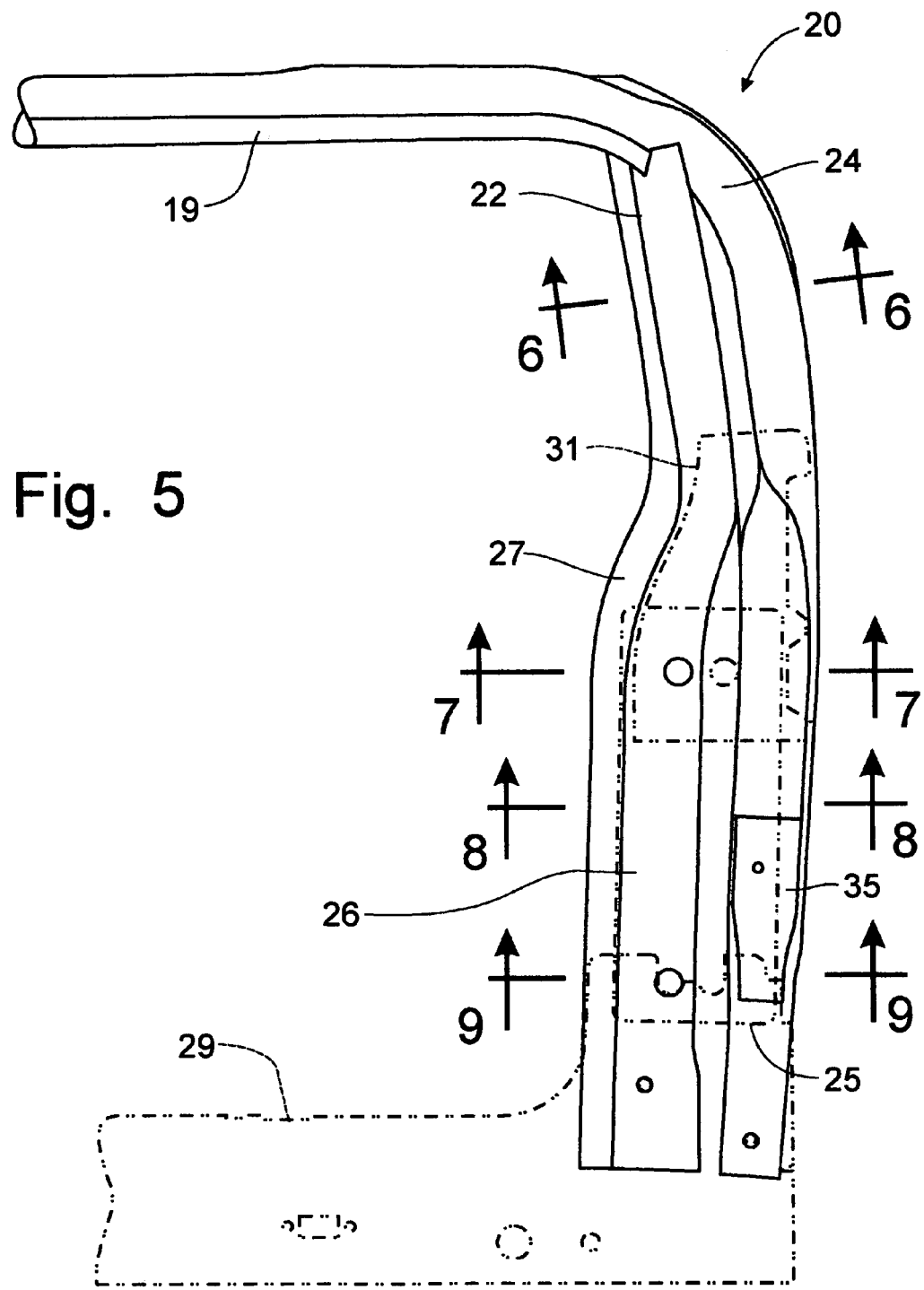
FIG. 5 is an enlarged partial side elevational view of the rear corner pillar depicted in FIG. 4, attachment brackets being shown in phantom.

Referring to FIGS. 1 5, a frame for the operator's cab of a pick-up truck can be seen. The frame 10 of the operator's cab includes a rear corner pillar structure that incorporates the principles of the instant invention. Any left and right references are used as a matter of convenience and are determined by standing at the rear of the operator's cab and facing the normal direction of travel of the pick-up truck. The frame 10 of the operator's cab is formed with a generally vertical front (or "A") pillar 12 extending between the floor member 14 and the roof 15. A rear pillar 20 completes the generally rectangular configuration of the frame 10 and is intended to encompass both front and rear doors (not shown). The front door will hinge on the front "A"pillar 12, while the rear "B"pillar will support the hinges for the rear door. A back panel 17, as well as the roof member 15, extends from one side of the vehicle frame 10 to the other, spanning between the transversely spaced rear corner pillars 20.

Each of the rear corner pillars 20, though only one is depicted in the drawings, is formed in a dual cell configuration with a front tubular member 22 and a rear tubular member 24. The rear tubular member 24 also transitions into the side roof rail 19 from the rear pillar 20. Both the front and rear tubular members 22, 24 are connected to the floor member 14 and extend generally vertically to the roof 15. The front tubular member 22 terminates at the roof rail area 19 and supports the rear tubular member 24 as the rear tubular member 24 curves forwardly and transitions into the side roof rail 19. The front tubular member 22 is preferably welded along an upper portion thereof to the rear tubular member 24 to increase section strength near the roof 15, but is separated from the rear tubular member 24 along a lower portion thereof to increase the overall size of the pillar section.

An outer reinforcement bracket 25 can be welded to the front and rear tubular members 22, 24 at a central location where the two tubular members 22, 24 separate to increase the longitudinal width of the rear corner pillar 20. This outer reinforcement bracket 25 stiffens the inside corner of the operator's cab and provides additional support for the door hinge. Similarly, an inner reinforcement bracket 31 can be welded to the front and rear tubular members 22, 24 along the inner surface of the rear corner pillar 20 and provides a mounting surface for the back panel 17 that spans across the operator's cab between the rear corner pillars 20.

Figure 6:
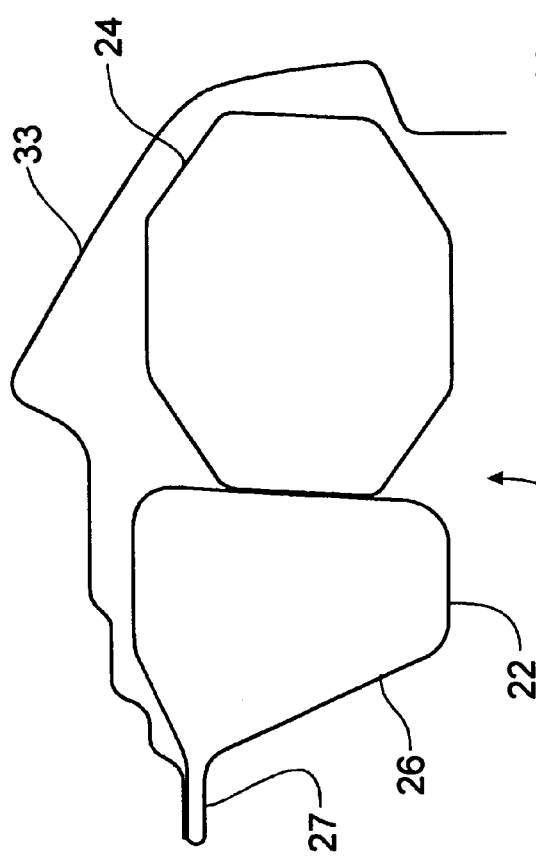
FIG. 6 is a partial cross-sectional view of the rear corner pillar taken along lines 6-6 of FIG. 5.

Referring now to the cross-sectional views in FIGS. 6-9, the varying shape of the front and rear tubular members 22, 24 can best be seen. In FIG. 6, taken through an upper portion of the rear pillar 20 where the front and rear tubular members 22, 24 are nested together to increase the section strength of the rear corner pillar 20, the front tubular member 22 is formed generally as a quadrilateral body portion 26 with a short forwardly directed flange 27. The rear tubular member 24 is generally formed as an octagon that has substantially the same transverse depth as the front tubular member 22 so that the front tubular member 22 can intersect and support properly the rear tubular member 24 at the roof rail area 19.

Figure 7:
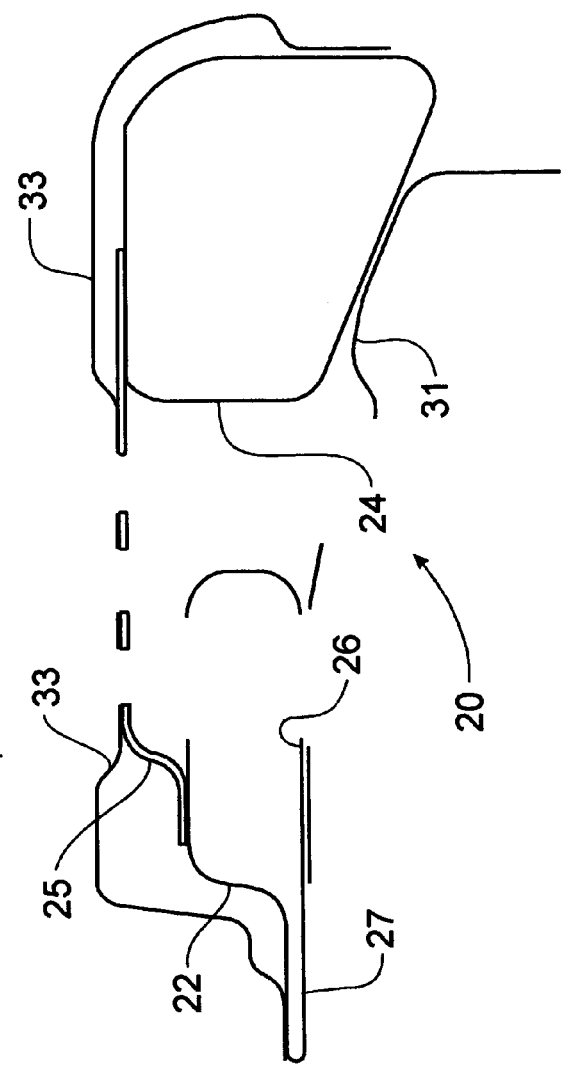
FIG. 7 is a partial cross-sectional view of the rear corner pillar taken along lines 7-7 of FIG. 5.

As can be seen in FIG. 7, which is taken through the reinforcement member 25, the front tubular member 22 decreases the transverse depth while the body portion 26 is shaped generally as a rectangle with the forwardly extending flange 27 having a greater longitudinal length than is found in the upper portion of the rear pillar 20. The rear tubular member 24 also undergoes some shape transformation and is generally trapezoidal in cross-section. The front and rear tubular members 22, 24 are separated to increase the longitudinal width of the rear pillar 20. Furthermore, this cross-sectional view shows the positioning of the inner reinforcement bracket 31 and an outer trim panel 33 that encloses the front and rear tubular members 22, 24. The outer reinforcement bracket 25 spans across the gap between the front and rear tubular members 22, 24 and is affixed to both.

Figure 8:
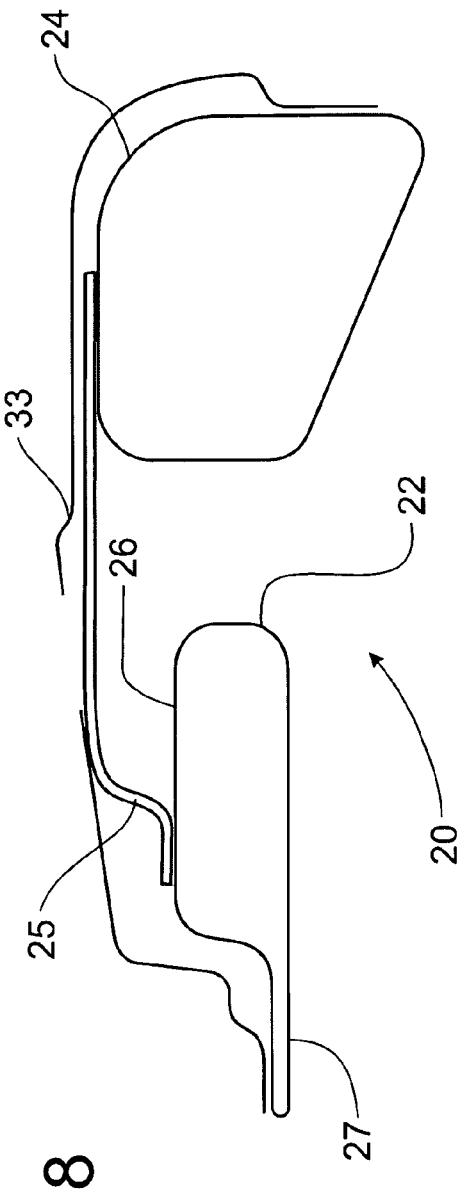
FIG. 8 is a partial cross-sectional view of the rear corner pillar taken along lines 8-8 of FIG. 5.
Figure 9:
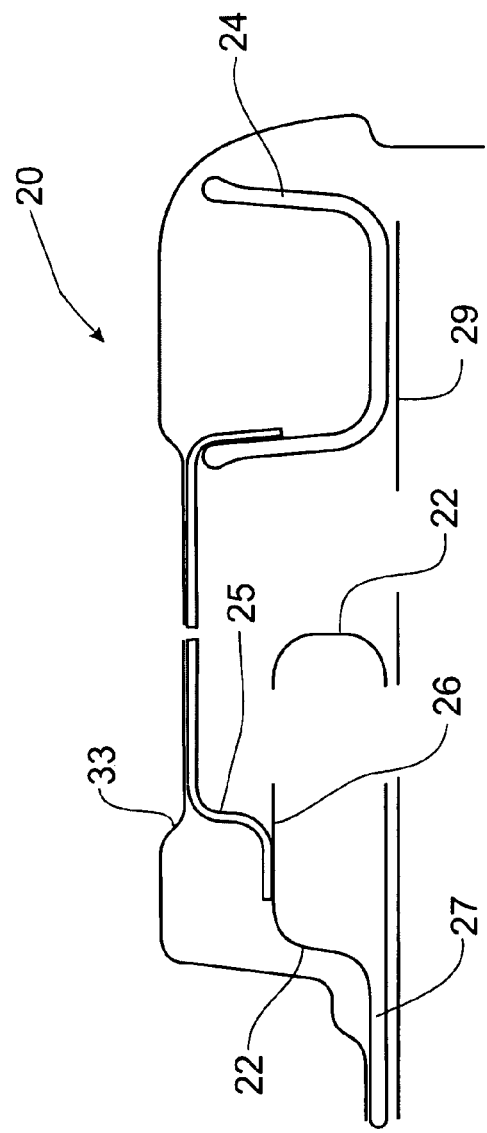
FIG. 9 is a partial cross-sectional view of the rear corner pillar taken along lines 9-9 of FIG. 5.

Referring now to the cross-sectional view of FIG. 8, which is taken below the inner reinforcement bracket 31, the front and rear tubular members 22, 24 remain separated to continue the larger longitudinal width of the rear pillar 20, while the outer trim panel 33 and the outer reinforcement bracket 25 remain in a consistent orientation. FIG. 9 reflects the cross-sectional configuration of the rear pillar 20 at the extreme lower portion of the rear pillar 20. The body portion 26 of the front tubular member 22 remains in the generally rectangular configuration, while the rear tubular member 24 undergoes another change in shape into a U-shaped cross-section, which begins the transition from the trapezoidal shape at the transition area 35. A reinforcement member 29 spans between the front and rear tubular members 22, 24 to facilitate the connection of the floor member 14.

Referring now to the elevational view of FIG. 5, the rear tubular member 24 curves forwardly over top of the front tubular member 22 to transition into the roof side rail 19. The front tubular member 22 engages and is attached, such as by welding, to the underside of the transitioning rear tubular member 24 to provide support for the transition into the roof side rail 19. Without the support provided by the front tubular member 22, the moment exerted by the roof loads on the rear tubular member 24 would be greater, as the front tubular member 22 shortens the moment arm of the rear tubular member 24.

The formation of the rear corner pillar 20 by two tubular members 22, 24, which can be formed and bent in a conventional manner or formed through a hydroforming process, enables the rear corner pillar to be produced with smaller tubular blanks which are more cost effective than a single larger diameter tubular blank, and the smaller tubular blanks can be formed more easily than the larger diameter members. Furthermore, the dual cell configuration of the rear corner pillar provides a stronger cross-section than a single tubular pillar member, and, therefore, can resist greater loads and forces.

One skilled in the art will recognize that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. In a vehicle frame having a generally vertical front pillar, a generally vertical rear pillar spaced longitudinally rearwardly of the front pillar, and a roof structure and a floor structure interconnecting the front and rear pillars, the improvement comprising:

the rear pillar being formed with a front member and a rear member oriented longitudinally, each of the front and rear members having a lower portion, the lower portions being spaced longitudinally.

2. The vehicle frame of claim 1 wherein the front and rear members are formed tubular members.

3. The vehicle frame of claim 2 wherein the front member is nested against the rear member along an upper portion thereof.

4. The vehicle frame of claim 3 wherein the front member is welded to the rear member at the upper portion.

5. The vehicle frame of claim 1 further comprising a hinge reinforcement bracket attached to the front and rear members.

6. The vehicle frame of claim 1 wherein the rear member curves forwardly into the roof structure at a curved transition portion, the front member engaging the curved transition portion to provide support therefore.

7. The vehicle frame of claim 1 wherein the front member is formed with a body portion and a forwardly extending flange formed along the body portion.

8. The vehicle frame of claim 7 wherein the body portion of the front member has a rectangular shape.

9. A rear pillar in a vehicle frame including a front pillar and a roof and floor structure interconnecting the front and rear pillars comprising:

a tubular rear member extending generally vertically from the floor structure to the roof structure and including a forwardly curved transition portion leading into the roof structure; and a tubular front member extending generally vertically from the floor structure and engaging the transition portion of the rear tubular member to provide support thereof.

10. The rear pillar of claim 9 wherein the front member is nested against the rear member along an upper portion thereof.

11. The rear pillar of claim 10 wherein the front member is welded to the rear member at the upper portion.

12. The rear pillar of claim 11 wherein each of the front and rear members has a lower portion, the lower portions being spaced longitudinally.

13. The rear pillar of claim 12 further comprising a reinforcement bracket attached to the front and rear members.

14. The rear pillar of claim 12 wherein the front member is formed with a generally rectangular body portion and a flange extending forwardly from the body portion, the body portion varying in transverse depth from the lower portion to the upper portion.

15. An automotive frame comprising:

a generally horizontally extending floor structure;

a generally horizontally extending roof structure positioned vertically above the floor structure;

a generally vertical front pillar interconnecting the floor and roof structures to support the roof structure above the floor structure; and a generally vertical rear pillar interconnecting the floor and roof structures for the support of the roof structure above the floor structure, the rear pillar including a rear formed tubular member extending vertically from the floor structure and including a transition portion extending forwardly and leading into the roof structure, the rear pillar further including a front formed tubular member extending vertically from the floor structure and engaging the transition portion to provide support thereto.

16. The automotive frame of claim 15 wherein the front member is nested against the rear member along an upper portion thereof, the front member being welded to the rear member at the upper portion.

17. The automotive frame of claim 16 wherein each of the front and rear members has a lower portion, the lower portions being spaced longitudinally.

18. The rear pillar of claim 17 wherein the front member is formed with a generally rectangular body portion and a flange extending forwardly from the body portion, the body portion varying in transverse depth from the lower portion to the upper portion.

19. The rear pillar of claim 18 further comprising a reinforcement bracket attached to both the front and rear members.

* * * * *